US012562443B2

(12) United States Patent
Alig

(10) Patent No.: US 12,562,443 B2
(45) Date of Patent: Feb. 24, 2026

(54) STORE HOUSING FOR AN ELECTRICAL ENERGY STORE HAVING A VALVE DEVICE FOR REMOVING LIQUID

(71) Applicant: Bayerische Motoren Werke Aktiengesellschaft, Munich (DE)

(72) Inventor: Robert Alig, Germering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 497 days.

(21) Appl. No.: 18/112,226

(22) Filed: Feb. 21, 2023

(65) Prior Publication Data

US 2023/0299448 A1 Sep. 21, 2023

(30) Foreign Application Priority Data

Mar. 15, 2022 (DE) ..................... 10 2022 105 996.0

(51) Int. Cl.
H01M 50/691 (2021.01)
B60L 50/64 (2019.01)
(Continued)

(52) U.S. Cl.
CPC ........... H01M 50/691 (2021.01); B60L 50/64 (2019.02); H01M 50/24 (2021.01); H01M 50/249 (2021.01); *H01M 2220/20* (2013.01)

(58) Field of Classification Search
None
See application file for complete search history.

(56) References Cited

U.S. PATENT DOCUMENTS

| | | | | | |
|---|---|---|---|---|---|
| 1,329,559 | A | | 2/1920 | Tesla | |
| 2014/0332085 | A1* | | 11/2014 | Grace | ................. H01M 10/625 |
| | | | | | 429/82 |

(Continued)

FOREIGN PATENT DOCUMENTS

| | | |
|---|---|---|
| DE | 10 2013 014 903 A1 | 3/2015 |
| DE | 11 2019 005 681 T5 | 7/2021 |
| DE | 10 2020 202 752 A1 | 9/2021 |

OTHER PUBLICATIONS

German-language Search Report issued in German Application No. 10 2022 105 996.0 dated Dec. 21, 2022 with partial English translation (10 pages).

*Primary Examiner* — Gregg Cantelmo
(74) *Attorney, Agent, or Firm* — Crowell & Moring LLP

(57) ABSTRACT

A store housing for an electrical energy store of a motor vehicle includes multiple housing walls which surround a receiving space for receiving at least one storage component of the electrical energy store, wherein at least one of the housing walls has a passage opening for discharge of a liquid which has accumulated in the receiving space into surroundings of the store housing, and at least one valve which is designed to conduct the liquid away from the receiving space into the surroundings via the passage opening and to at least reduce ingress of liquid from the surroundings into the receiving space via the passage opening. The at least one valve has a passive valve arranged in or at the passage opening. The valve has a first flow resistance in a first flow direction from the receiving space into the surroundings and has a second flow resistance in a second flow direction from the surroundings into the receiving space, which second flow resistance is larger in comparison with the first flow resistance.

9 Claims, 4 Drawing Sheets

(51) Int. Cl.
　　　*H01M 50/24*　　　　(2021.01)
　　　*H01M 50/249*　　　(2021.01)

(56)　　　　　　　References Cited

U.S. PATENT DOCUMENTS

| | | | |
|---|---|---|---|
| 2020/0152935 A1 | 5/2020 | Wynn et al. | |
| 2022/0255185 A1* | 8/2022 | Lee | .................... H01M 50/367 |

* cited by examiner

STORE HOUSING FOR AN ELECTRICAL ENERGY STORE HAVING A VALVE DEVICE FOR REMOVING LIQUID

CROSS REFERENCE TO RELATED APPLICATION

This application claims priority under 35 U.S.C. § 119 from German Patent Application No. 102022105996.0, filed Mar. 15, 2022, the entire disclosure of which is herein expressly incorporated by reference.

BACKGROUND AND SUMMARY

The invention relates to a store housing for an electrical energy store of a motor vehicle. The store housing has multiple housing walls which surround a receiving space for receiving at least one storage component of the electrical energy store. At least one of the housing walls has a passage opening for discharge of a liquid which has accumulated in the receiving space into surroundings of the store housing. The store housing moreover has at least one valve device which is designed to conduct the liquid away from the receiving space into the surroundings via the passage opening and to at least reduce ingress of liquid from the surroundings into the receiving space via the passage opening. The invention also relates to an electrical energy store with the housing.

The focus of interest in the present case is on electrical energy stores which are used in particular as traction batteries for electrically drivable motor vehicles, that is to say hybrid or electric vehicles. Such electrical energy stores normally have a multiplicity of storage components, inter alia a multiplicity of interconnected storage cells, which are arranged in a receiving space of a store housing of the electrical energy store. The store housing is generally technically leak-tight, but has a pressure-equalization element for pressure equalization with surroundings of the motor vehicle. Moreover, the energy store may have a coolant-guiding cooling device for cooling the storage cells.

In particular, in regions having a hot and humid outside climate, a situation can arise in which the inside climate within the store housing adjusts to the outside climate in that air flows from the surroundings into the receiving space of the store housing via the pressure-equalization element. If the temperature of the cooling device is below a dew point of the air that enters, then water condenses from the air at the cooling device and accumulates in the receiving space. An accumulation of liquid in the receiving space can also occur in the event of breakage of a cooler, owing to escaping coolant. Such accumulations of liquid are undesirable since they can damage the storage components of the electrical energy store. Such damage can lead to a thermal event of a storage component. Moreover, flammable hydrogen can form in the receiving space.

It is thus known from the prior art, for example from DE 10 2013 014 903 A1, to remove the liquid, for example via a valve, from the receiving space. Such valves usually have a movable valve body which opens up a passage opening in a housing wall of the store housing for removal of the liquid from the receiving space into the surroundings and hinders ingress of liquid from the surroundings into the receiving space. Owing to the movable valve body, such a valve is susceptible to damage, for example due to driving-related shocks.

It is the object of the present invention to provide a particularly robust solution by means of which a liquid can be removed from a store housing of an electrical energy store.

This and other objects are achieved according to the invention by a store housing and an electrical energy store having the features according to the respective independent patent claims. Advantageous embodiments of the invention are the subject of the dependent patent claims, the description and the figures.

A store housing according to the invention for an electrical energy store of a motor vehicle comprises multiple housing walls which surround a receiving space for receiving at least one storage component of the electrical energy store, wherein at least one of the housing walls has a passage opening for discharge of a liquid which has accumulated in the receiving space into surroundings of the store housing. The store housing moreover comprises at least one valve device which is designed to conduct the liquid away from the receiving space into the surroundings via the passage opening and to at least reduce ingress of liquid from the surroundings into the receiving space via the passage opening. The at least one valve device has a passive valve with rigid structures that is arranged in or at the passage opening, said valve having a first flow resistance in a first flow direction from the receiving space into the surroundings and having a second flow resistance in a second flow direction from the surroundings into the receiving space, which second flow resistance is larger in comparison with the first flow resistance.

The invention moreover includes an electrical energy store having at least one storage component and having a store housing according to the invention, wherein the at least one storage component is arranged in the receiving space of the store housing. In particular, the electrical energy store has a multiplicity of storage components, for example storage cells. The storage cells may for example be round cells, prismatic battery cells and/or pouch cells. It is also possible for further storage components, for example electronic components such as sensor devices, cooling devices, etc., to be arranged in the receiving space. The store housing has multiple housing walls which surround the receiving space for the storage components. Arranged in at least one housing wall is the passage opening or guide-through via which liquid can be removed from the receiving space out into the surroundings. Said liquid can accumulate in the receiving space for example owing to formation of condensation water and/or breakage of a cooler.

In order then to prevent a large quantity of liquid, for example owing to spray water or a static water column from entering the receiving space from the surroundings via the passage opening, the at least one valve device is provided. The valve device conducts the liquid away from the receiving space, but reduces, preferably blocks, ingress of liquid into the receiving space. In other words, the valve device is designed to allow a liquid flow in the first flow direction from the receiving space into the surroundings, and to hinder, in particular to completely block, a liquid flow in the opposite, second, flow direction from the surroundings into the receiving space. For this purpose, the valve device is a passive valve. Preferably, the passive valve is a Tesla valve. The passive valve may be arranged for example directly in the passage opening of the housing wall. The passive valve may also be arranged outside the receiving space or inside the receiving space on the housing wall of the store housing and be fluidically coupled to the passage opening. Said passive valve has a larger flow resistance in the second flow direction than in the first flow direction. The special feature of the passive valve is that it does not have a movable valve body and consequently does not have any movable mechanical parts, but rather is able to provide the different flow resistances and thus the valve function solely via the geometrical configuration of its rigid structures. The rigid structures form in this case flow channels for the liquid.

In the case of the Tesla valve, this has for example a rigid channel system with a main flow channel and with loop-shaped, flow-direction-reversing secondary flow channels which depart from the main flow channel. The Tesla valve is designed to conduct the liquid, in particular exclusively, via the main flow channel in the first flow direction and to conduct the liquid at least partially via the flow-direction-reversing secondary flow channels in the second flow direction. The loop-shaped secondary flow channels are thus formed and connected to the main flow channel in such a way that the liquid can enter the secondary flow channels from the main flow channel only when flowing in the second flow direction and, when exiting the secondary flow channels, counteracts the flow in the main flow channel. This means that the liquid entering the secondary flow channels, when exiting, either flows in the first flow direction again and consequently into the surroundings or stops, through build-up of a counterpressure, the liquid flowing along the second flow direction via the main flow channel and consequently at least reduces ingress into the receiving space.

The use of such a passive valve provides a particularly robust and simple valve device.

It may also be provided that the at least one valve device additionally has a non-return fitting which is arranged between the receiving space and the passive valve. The non-return fitting is in particular in the form of a flow-pressure-controlled, spring-loaded non-return flap. The non-return fitting opens up the path for the liquid from the receiving space to the passive valve as soon as a (flow) pressure of the liquid exceeds a predetermined threshold value. In addition, the non-return fitting prevents liquid from the surroundings that has overcome the second flow resistance of the passive valve and has been conducted through the passive valve in the second flow direction from entering the receiving space. The use of the upstream passive valve allows the spring restoring force to be configured to be small. In this way, even low static or dynamic pressures, for example in the case of a low water level in the receiving space, can lead to opening.

In one refinement of the invention, the valve device has at least one valve housing in which the non-return fitting and the passive valve are arranged and which is arranged in the receiving space of the store housing at the passage opening. The valve housing thus forms a drainage channel which is arranged in the receiving space and via which the liquid exits the receiving space into the surroundings. Liquid which enters from the surroundings via the passive valve is retained by the non-return fitting in the valve housing and can be guided back into the surroundings again via the passive valve.

In one embodiment of the invention, the store housing comprises a first passage opening and a first valve device, which are arranged in a first housing wall and are designed to remove liquid with a first flow direction, due to vehicle acceleration, from the receiving space, and comprises at least one second passage opening and at least one second valve device, which are arranged in a second housing wall and are designed to remove liquid with a second flow direction, due to vehicle acceleration, from the receiving space. This embodiment is based on the realization that a flow direction of the liquid in the receiving space depends on a sign of the acceleration of the motor vehicle. When the motor vehicle accelerates, then the liquid flows in the first flow direction, and when the motor vehicle brakes, the liquid flows in the opposite second direction. In order to prevent the liquid from sloshing around uncontrollably in the receiving space, provision is made of at least two passage openings and at least two valve devices with in each case one passive valve, for example in each case one Tesla valve, in two opposite housing walls, which, according to flow direction, can remove the liquid from the receiving space into the surroundings.

It proves to be advantageous if at least one of the housing walls has at least one liquid reservoir for collecting the liquid, from which at least one liquid reservoir the liquid exits, and flows to one of the valve devices, in a vehicle-acceleration-induced manner. In particular, the liquid reservoir is arranged in a base-side housing wall, and the passage openings and the valve devices are arranged in a front-side and a rear-side housing wall. The liquid reservoir may for example be a depression in the housing base. In addition, guide grooves sloping downward in the direction of the depression may be formed in the housing base in order to conduct the liquid into the reservoir. From a specific quantity of liquid in the reservoir and/or from a specific positive or negative acceleration of the motor vehicle, the liquid can exit the reservoir, flow in the direction of one of the valve devices and activate the valve device at sufficient pressure for conducting the liquid away.

In a further configuration of the invention, the store housing additionally has an air inlet and an air outlet for guidance of air through the receiving space, and also a blower for generating an air stream from the air inlet to the air outlet, which is configured such that, for reducing the liquid in the receiving space, it takes up moisture from the receiving space and transports said moisture into the surroundings via the air outlet. The air inlet and the air outlet may be provided for example for pressure equalization in the store housing and equipped for example with a membrane. The blower, which may be arranged for example at the air inlet, sucks in the air in the region of the air inlet and conveys the air in the direction of the air outlet situated opposite. The resulting continuous air stream takes up liquid and transports it out of the vicinity via the air outlet.

The embodiments presented with regard to the store housing according to the invention, and the advantages thereof, apply correspondingly to the electrical energy store according to the invention.

Further features of the invention emerge from the claims, the figures and the description of the figures. The features and feature combinations mentioned above in the description, and the features and feature combinations mentioned below in the description of the figures and/or shown in the figures alone, may be used not only in the respectively specified combination but also in other combinations or individually.

Other objects, advantages and novel features of the present invention will become apparent from the following detailed description of one or more preferred embodiments when considered in conjunction with the accompanying drawings.

BRIEF DESCRIPTION OF THE DRAWINGS

In the figures, identical and functionally identical elements are denoted by the same reference signs.

DETAILED DESCRIPTION OF THE DRAWINGS

Figure 1:
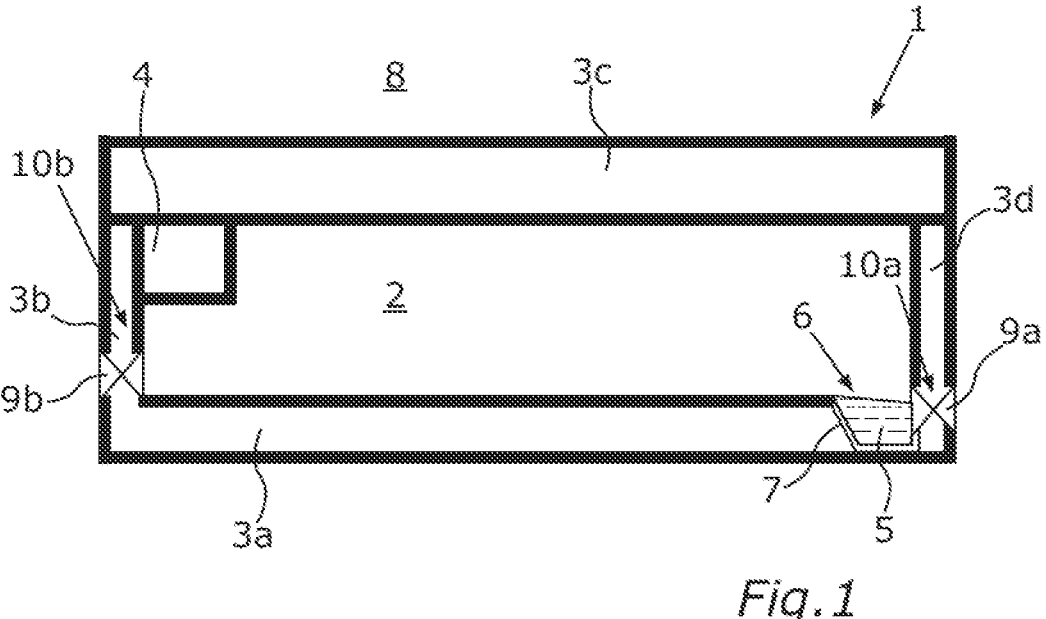
FIG. 1 is a schematic illustration of an embodiment of a store housing.

FIG. 1 shows a store housing 1 for an electrical energy store of a motor vehicle. In a receiving space 2 of the store housing 1, which is surrounded by housing walls 3a, 3b, 3c, 3d, there may be arranged storage components, for example storage cells, electronic devices 4, for example control devices and sensor devices, cooling devices for cooling the storage cells, etc. Here, the housing walls 3a, 3b, 3c, 3d are a housing base 3a, a housing front wall 3b, a housing cover 3c and a housing rear wall 3d. The housing walls 3a, 3b, 3c, 3d may also be in the form of sub-regions of a store housing 1 which consists of two trough-shaped housing parts fitted together. In the event of breakage of a cooler or in the event of condensation water, a situation may arise in which liquid 5 accumulates in the receiving space 2. Here, the housing base 3a has at least one reservoir 6 in the form of a depression 7, in which the liquid 5 is collected at a defined place in the receiving space 2. In the housing base 3a, there may moreover be arranged guide grooves which lead to the at least one reservoir 6 and which conduct liquid 5 into reservoir 6.

Figure 2:
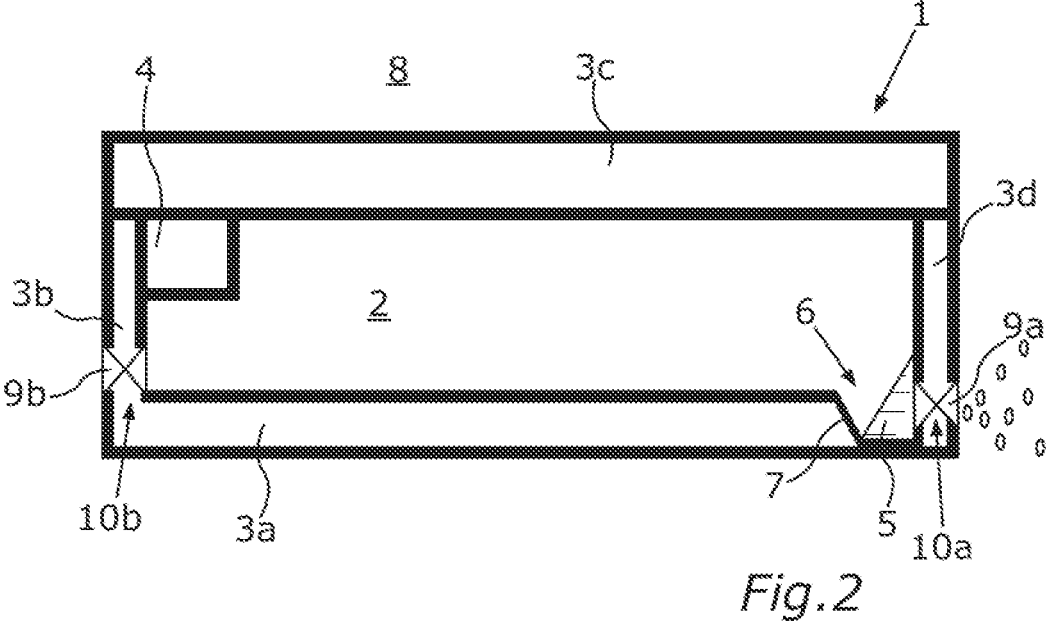
FIG. 2 shows the store housing as per FIG. 1 during removal of liquid.

In order for it to be possible for the liquid 5 to be conducted from the receiving space 2 into surroundings 8 of the store housing 1, the store housing 1 has at least one, here two valve devices 9a, 9b, which are arranged in or at passage openings 10a, 10b of the housing walls 3b, 3d. Here, a first valve device 9a is integrated into the housing rear wall 3d and removes the liquid 5 which, as shown in FIG. 2, sloshes out of the reservoir 6 against the housing rear wall 3d as a result of acceleration of the motor vehicle. A second valve device 9b is integrated into the housing front wall 3b and removes the liquid 5 which sloshes out of the reservoir 6 against the housing front wall 3b as a result of braking of the motor vehicle.

Figure 3:
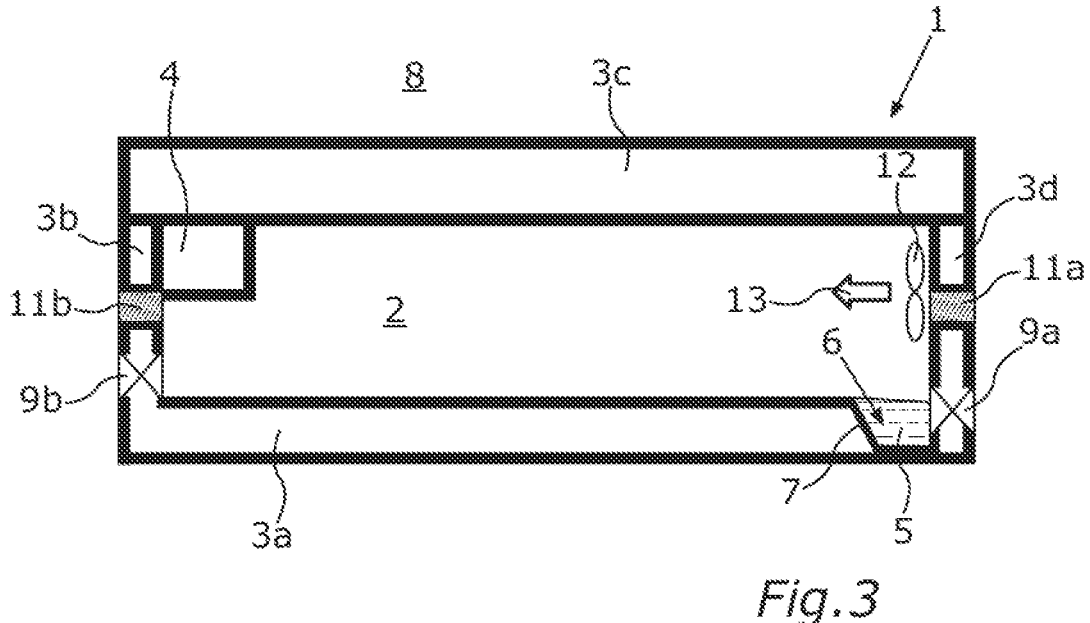
FIG. 3 is a schematic illustration of a further embodiment of a store housing.

It is moreover possible for the store housing 1 to have, as shown in FIG. 3, an air inlet 11a, here in the housing rear wall 3d, and an air outlet 11b, here in the housing front wall 3b, via which, for pressure equalization, an exchange of air between the receiving space 2 and the surroundings 8 can take place. At the air inlet 11a, there is arranged here a blower 12 or a fan, which generates a continuous air stream 13 from the air inlet 11a to the air outlet 11b. The air stream 13 can likewise transport liquid 5 from the receiving space 2 into the surroundings 8.

Figure 4:
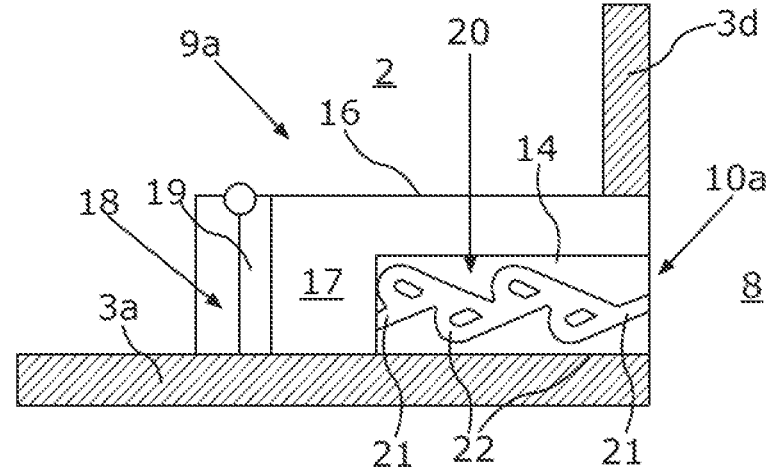
FIG. 4 is a schematic illustration of an embodiment of a valve device of the store housing.
Figure 5:
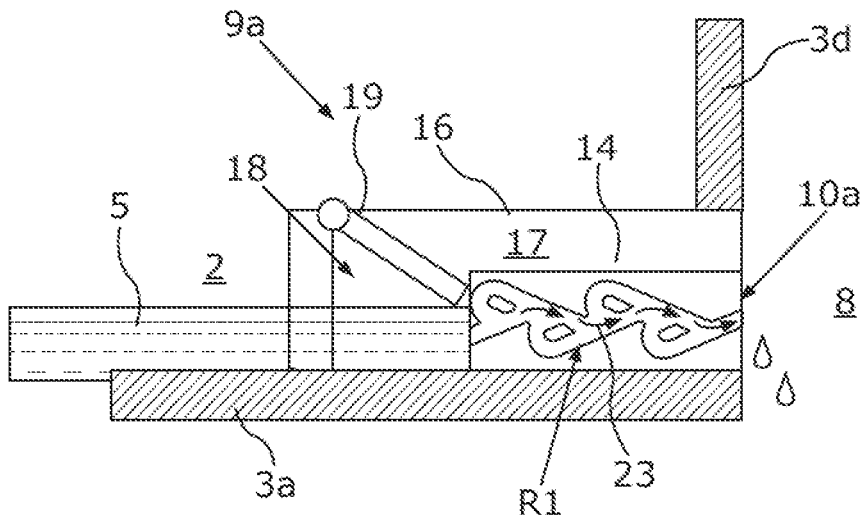
FIG. 5 shows the valve device as per FIG. 4 during removal of liquid from the store housing.
Figure 6:
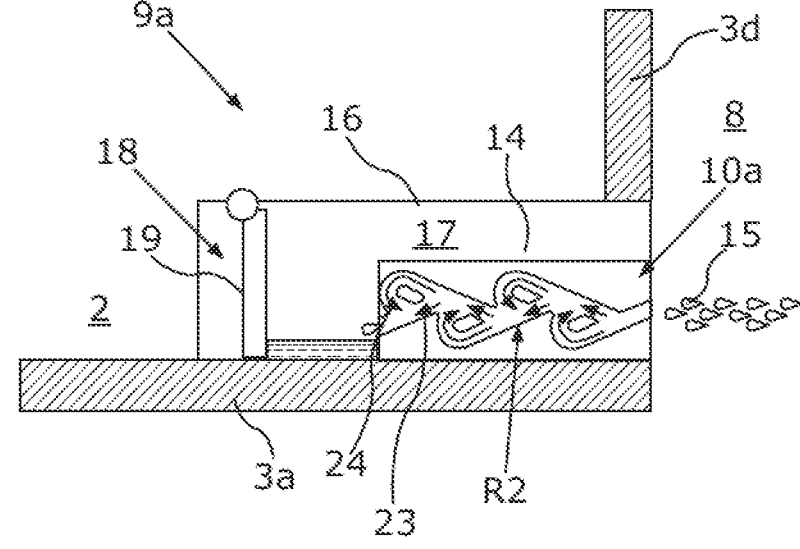
FIG. 6 shows the valve device as per FIG. 4 during blockage of dynamic liquid from surroundings of the store housing.
Figure 7:
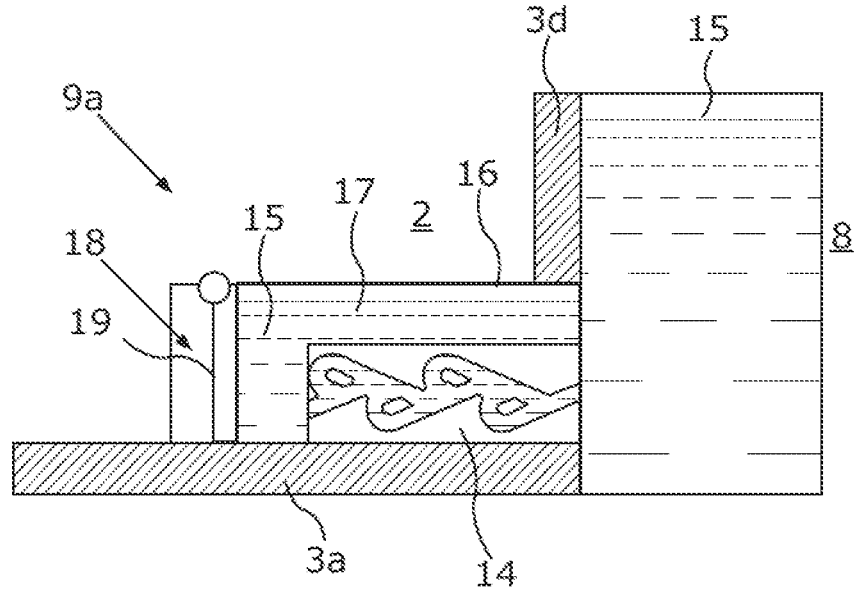
FIG. 7 shows the valve device as per FIG. 4 during blockage of static liquid from surroundings of the store housing.

FIG. 4 shows here the valve device 9a, wherein the valve device 9b may be of identical form. The valve device 9a has a passive valve 14, which is here in the form of a Tesla valve 14 and which is designed to transport the liquid 5 from the receiving space 2 into the surroundings 8 via the passage opening 10a along a first flow direction R1, as shown in FIG. 5; moreover, the Tesla valve 14, as shown in FIG. 6 and FIG. 7, is designed to at least reduce ingress of dynamic liquid 15, for example of spray water, or of static liquid 15, for example of a water column, from the surroundings 8 into the receiving space 2 via the passage opening 10a along a second flow direction R2. The Tesla valve 14 is arranged here in a valve housing 16 which forms a drainage channel 17. Also arranged in the valve housing 16 is a non-return fitting 18 in the form of a spring-loaded non-return flap 19, which, at sufficient flow pressure of the liquid 5, opens up the drainage channel 17 in the direction of the Tesla valve 14. Moreover, the non-return fitting 18, as shown in FIG. 6 and FIG. 7, blocks ingress of liquid 15 which has passed into the drainage channel 17 via the Tesla valve 14. Here, the valve housing 16 is arranged in the receiving space 2 at the passage opening 10a.

The passive valve in the form of a Tesla valve 14 consists in this case of immovable parts and has a rigid channel system 20 with a main flow channel 21 and with loop-shaped secondary flow channels 22. In the first flow direction R1, the liquid 5 flows as a main flow 23 through the main flow channel 21. Only the liquid 15 flowing in the second flow direction R2 flows out of the main flow channel 21 into the secondary flow channels 22, which divert the liquid 15 in such a way that an opposing flow 24 is formed and blocks the main flow 23 flowing in the main flow channel 21.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A store housing for an electrical energy store of a motor vehicle, comprising:

multiple housing walls which surround a receiving space for receiving at least one storage component of the electrical energy store, wherein at least one of the multiple housing walls has a passage opening for discharge of a liquid that has accumulated in the receiving space into surroundings of the store housing; and a valve that conducts the liquid away from the receiving space into the surroundings via the passage opening and that reduces ingress of liquid from the surroundings into the receiving space via the passage opening, wherein the valve comprises a passive valve with rigid structures arranged in or at the passage opening, the passive valve has a first flow resistance in a first flow direction from the receiving space into the surroundings and has a second flow resistance in a second flow direction from the surroundings into the receiving space, the second flow resistance being larger in comparison with the first flow resistance, the valve additionally comprises a non-return fitting which is arranged between the receiving space and the passive valve.

2. The store housing according to claim 1, wherein the passive valve is a Tesla valve.

3. The store housing according to claim 1, wherein the non-return fitting is a flow-pressure-controlled, spring-loaded non-return flap.

4. The store housing according to claim 1, wherein
the valve comprises a valve housing in which the non-return fitting and the passive valve are arranged, the valve housing is arranged in the receiving space of the store housing at the passage opening.

5. An electrical energy store, comprising:
at least one storage cell; and
a store housing according to claim 1,
wherein the at least one storage cell is arranged in the receiving space of the store housing.

6. A store housing for an electrical energy store of a motor vehicle, comprising:
multiple housing walls which surround a receiving space for receiving at least one storage component of the electrical energy store, wherein
at least one of the multiple housing walls has a passage opening for discharge of a liquid that has accumulated in the receiving space into surroundings of the store housing; and
a valve that conducts the liquid away from the receiving space into the surroundings via the passage opening and that reduces ingress of liquid from the surroundings into the receiving space via the passage opening, wherein
the valve comprises a passive valve with rigid structures arranged in or at the passage opening,
the passive valve has a first flow resistance in a first flow direction from the receiving space into the surroundings and has a second flow resistance in a second flow direction from the surroundings into the receiving space, the second flow resistance being larger in comparison with the first flow resistance, and
a second valve comprising a passive valve, wherein
the passage opening and the valve are arranged in a first housing wall and are designed to remove liquid with a first flow direction, due to vehicle acceleration, from the receiving space, and
a second passage opening and the second valve are arranged in a second housing wall and are designed to remove liquid with a second flow direction, due to vehicle acceleration, from the receiving space.

7. The store housing according to claim 6, wherein
at least one of the housing walls has a liquid reservoir for collecting the liquid in the receiving space, from which liquid reservoir the liquid exits, and flows to either the valve or the second valve, in a vehicle-acceleration-induced manner.

8. The store housing according to claim 7, wherein
the liquid reservoir is arranged in a base-side housing wall, and
the passage opening and the second passage opening, and the valve and the second valve, are arranged in a front-side and a rear-side housing wall, respectively.

9. A store housing for an electrical energy store of a motor vehicle, comprising:
multiple housing walls which surround a receiving space for receiving at least one storage component of the electrical energy store, wherein
at least one of the multiple housing walls has a passage opening for discharge of a liquid that has accumulated in the receiving space into surroundings of the store housing; and
a valve that conducts the liquid away from the receiving space into the surroundings via the passage opening and that reduces ingress of liquid from the surroundings into the receiving space via the passage opening, wherein
the valve comprises a passive valve with rigid structures arranged in or at the passage opening,
the passive valve has a first flow resistance in a first flow direction from the receiving space into the surroundings and has a second flow resistance in a second flow direction from the surroundings into the receiving space, the second flow resistance being larger in comparison with the first flow resistance, and
an air inlet and an air outlet; and
a blower for generating an air stream from the air inlet to the air outlet, the blower being configured such that, for reducing the liquid in the receiving space, moisture from the receiving space is taken up and transported into the surroundings via the air outlet.

* * * * *